(12) United States Patent
Hirata

(10) Patent No.: US 9,246,360 B2
(45) Date of Patent: Jan. 26, 2016

(54) LAMINATE OF METAL PLATES, CORE FOR ROTATING ELECTRICAL MACHINE, AND LAMINATING METHOD FOR LAMINATE OF METAL PLATES

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 504 days.

(21) Appl. No.: 13/652,916

(22) Filed: Oct. 16, 2012

(65) Prior Publication Data

US 2013/0134826 A1    May 30, 2013

(30) Foreign Application Priority Data

Nov. 30, 2011  (JP) ................................ 2011-262408

(51) Int. Cl.
*H02K 1/06* (2006.01)
*H02K 15/02* (2006.01)

(52) U.S. Cl.
CPC .............. *H02K 1/06* (2013.01); *H02K 2201/09* (2013.01); *Y10T 29/49908* (2015.01); *Y10T 428/12347* (2015.01)

(58) Field of Classification Search
CPC .......... B32B 15/01; H02K 1/06; H02K 15/02; H02K 15/022; H02K 15/024; H02K 2201/09; H01F 3/02; H01F 27/245; H01F 27/2455; Y10T 428/12347; Y10T 29/49908
USPC ...................................... 310/216.048; 29/609
See application file for complete search history.

(56) References Cited

U.S. PATENT DOCUMENTS

| 2004/0032181 A1* | 2/2004 | Sirois ............................. 310/217 |
| 2004/0032316 A1 | 2/2004 | Sirois |
| 2008/0166581 A1* | 7/2008 | Grott et al. ..................... 428/594 |
| 2011/0277939 A1 | 11/2011 | Hirata |

FOREIGN PATENT DOCUMENTS

| CN | 102244437 | 11/2011 |
| JP | 49-67102 | 6/1974 |
| JP | 2-264411 | 10/1990 |

(Continued)

OTHER PUBLICATIONS

Chinese Office Action having mail date of Sep. 17, 2014.

(Continued)

*Primary Examiner* — Quyen Leung
*Assistant Examiner* — Eric Johnson
(74) *Attorney, Agent, or Firm* — Greenblum & Bernstein, P.L.C.

(57) ABSTRACT

A core is formed by laminating a plurality of core plates. Each of the core plates includes a joint portion for joining the core plates together in the laminated state. Each of the joint portions includes a fixing piece, a passage hole, a receiving portion, and an opening. Each of the fixing pieces is raised in the direction in which the core plates are laminated. Each of the passage holes receives the fixing piece of the corresponding adjacent one of the core plates. The fixing piece in the passage hole is bent to join the receiving portion to the adjacent core plate. Each of the openings receives the corresponding one of the fixing pieces to avoid interference with the fixing piece bent onto the receiving portion of another core plate.

9 Claims, 16 Drawing Sheets

(56) References Cited

FOREIGN PATENT DOCUMENTS

| JP | 2001-119871 | 4/2001 |
| JP | 2006-166500 | 6/2006 |
| JP | 2007-300795 | 11/2007 |
| JP | 2009-72014 | 4/2009 |

OTHER PUBLICATIONS

Japanese Official Action for JP2011-262408 having a mailing date of Mar. 24, 2015.

* cited by examiner

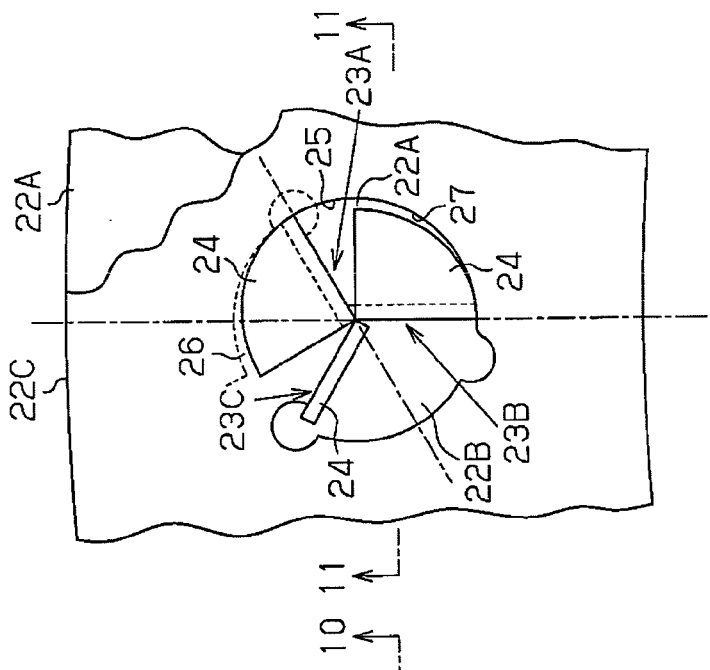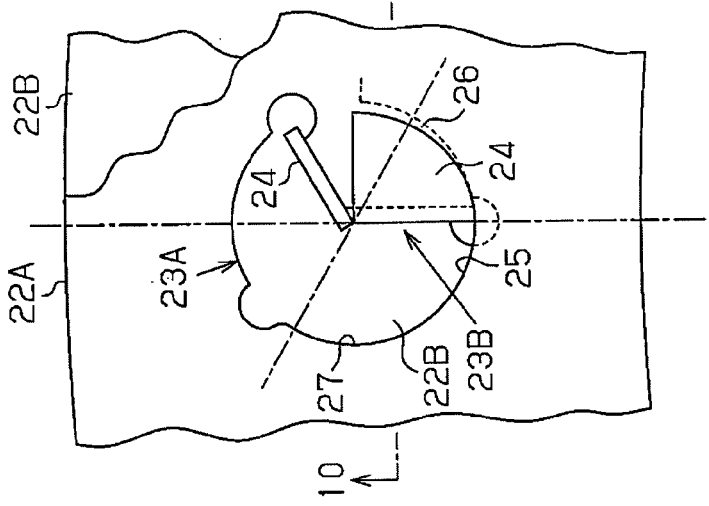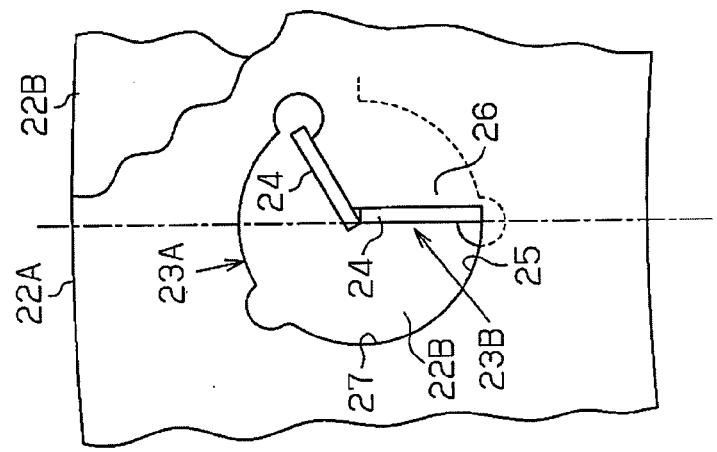

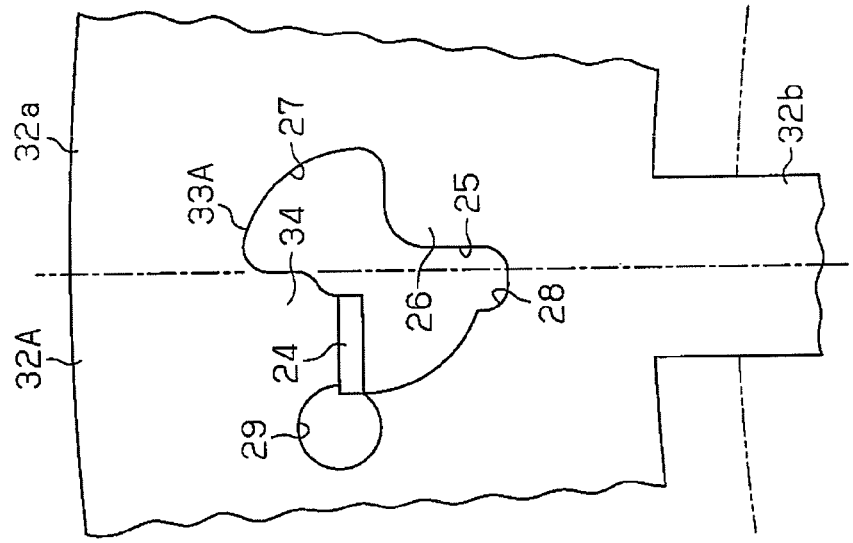
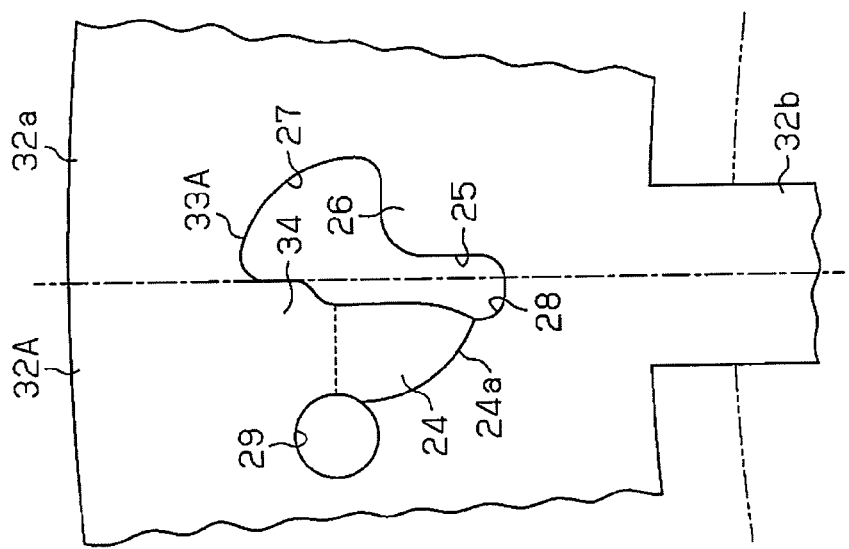

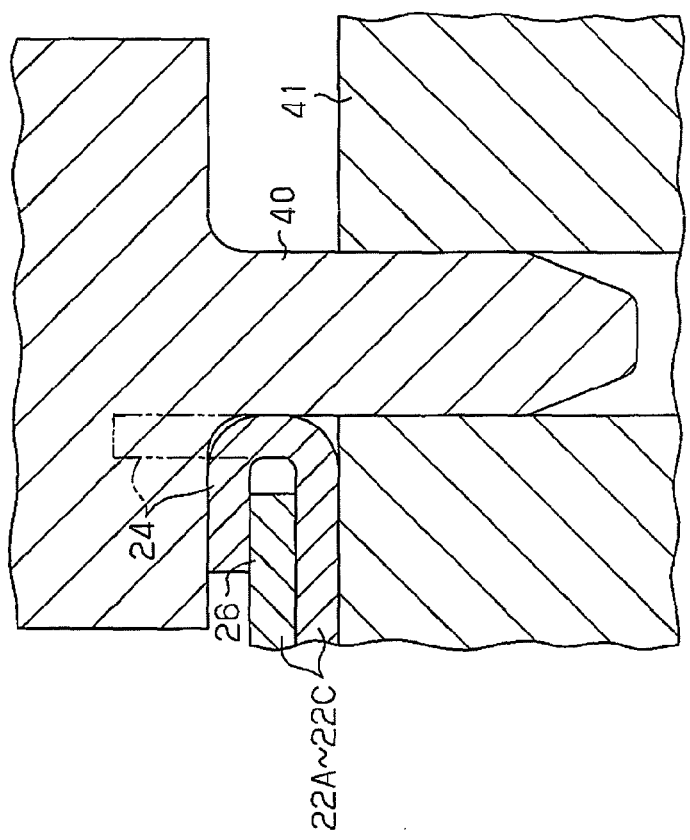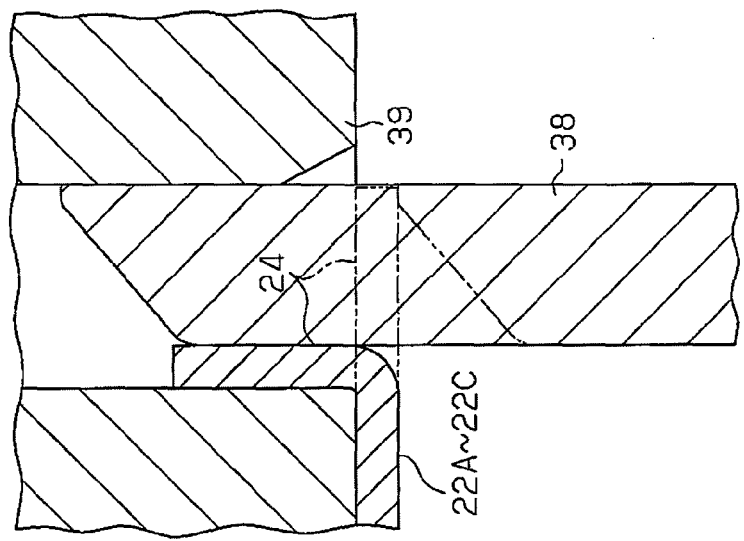

LAMINATE OF METAL PLATES, CORE FOR ROTATING ELECTRICAL MACHINE, AND LAMINATING METHOD FOR LAMINATE OF METAL PLATES

BACKGROUND OF THE INVENTION

The present invention relates to a laminate of metal plates such as a rotor core or a stator core for a rotating electrical machine such as a motor and to a laminating method for the laminate.

Typically, a core for a rotating electrical machine is a laminate of metal plates. The core is configured by joining a plurality of laminated core plates together. Structures for joining such laminated core plates are disclosed in Japanese Laid-Open Patent Publications No. 2-264411 and No. 2006-166500. Specifically, the structures join the laminated core plates to one another by engaging a projection of each of the core plates with a recess or a hole formed in an adjacent one of the core plates in the laminating direction.

However, since the conventional structures join the core plates simply through engagement between projections and corresponding recesses or holes, a high joint strength cannot be ensured. To solve this problem, an additional component must be employed to fix the laminated core plates together, thus complicating the structures. Further, if projections and recesses, each having a triangular cross section, are employed, the projections may be displaced along the inclined wall surfaces of the triangular recesses unless the positions of adjacent core plates are properly determined. As a result, a gap may be easily formed between adjacent core plates. This hampers the core function.

SUMMARY OF THE INVENTION

Accordingly, it is an objective of the present invention to provide a laminate of metal plates, a core for a rotating electrical machine, and a laminating method for the laminate that are capable of joining laminated metal plates to one another with high strength.

To achieve the foregoing objective and in accordance with one aspect of the present invention, a laminate formed by laminating a plurality of metal plates is provided. The laminate includes a joint portion provided in each of the metal plates, a fixing piece provided in each of the joint portions, a passage hole provided in each of the joint portions, a receiving portion provided in each of the joint portions, and an opening provided in each one of the joint portions. Each joint portion is joined to another one of the metal plates. Each fixing piece is raised in the laminating direction of the metal plates. Each fixing piece of the corresponding adjacent one of the metal plates is passed through the passage hole. Each receiving portion is joined to the corresponding adjacent one of the metal plates by bending the fixing piece passed through the passage hole. Each opening receives the fixing piece bent on the receiving portion of another one of the metal plates, thereby avoiding interference with the fixing piece.

BRIEF DESCRIPTION OF THE DRAWINGS

FIGS. 9A, 9B, and 9C are plan views showing the portions corresponding to the joint portions of the first to third core plates to illustrate assembling procedure of the joint portions;

FIG. 13A is an enlarged plan view showing a portion in the vicinity of a joint portion before a fixing piece is cut and raised;

FIG. 13B is an enlarged plan view showing the portion in the vicinity of the joint portion after the fixing piece is cut and raised;

FIG. 19 is a cross-sectional view showing a portion corresponding to a fixing piece to illustrate the state of the fixing piece at the time when the fixing piece is cut and raised;

FIG. 20 is a cross-sectional view showing the portion corresponding to the fixing piece to illustrate the state of the fixing piece at the time when the fixing piece is bent;

DETAILED DESCRIPTION OF THE PREFERRED EMBODIMENTS

First Embodiment

A stator core for a motor serving as a laminate according to a first embodiment of the present invention will now be described with reference to FIGS. 1 to 11.

Figure 1:
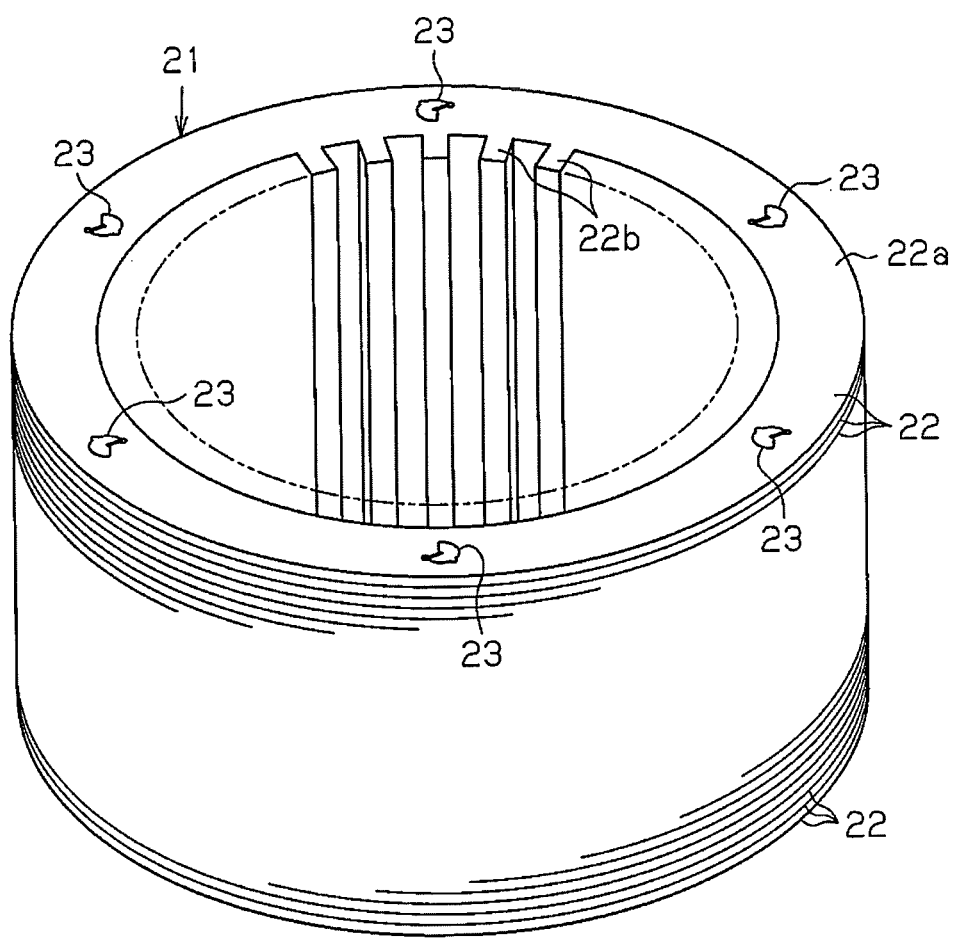
FIG. 1 is a perspective view showing a stator core for a motor according to a first embodiment of the present invention.
Figure 2:
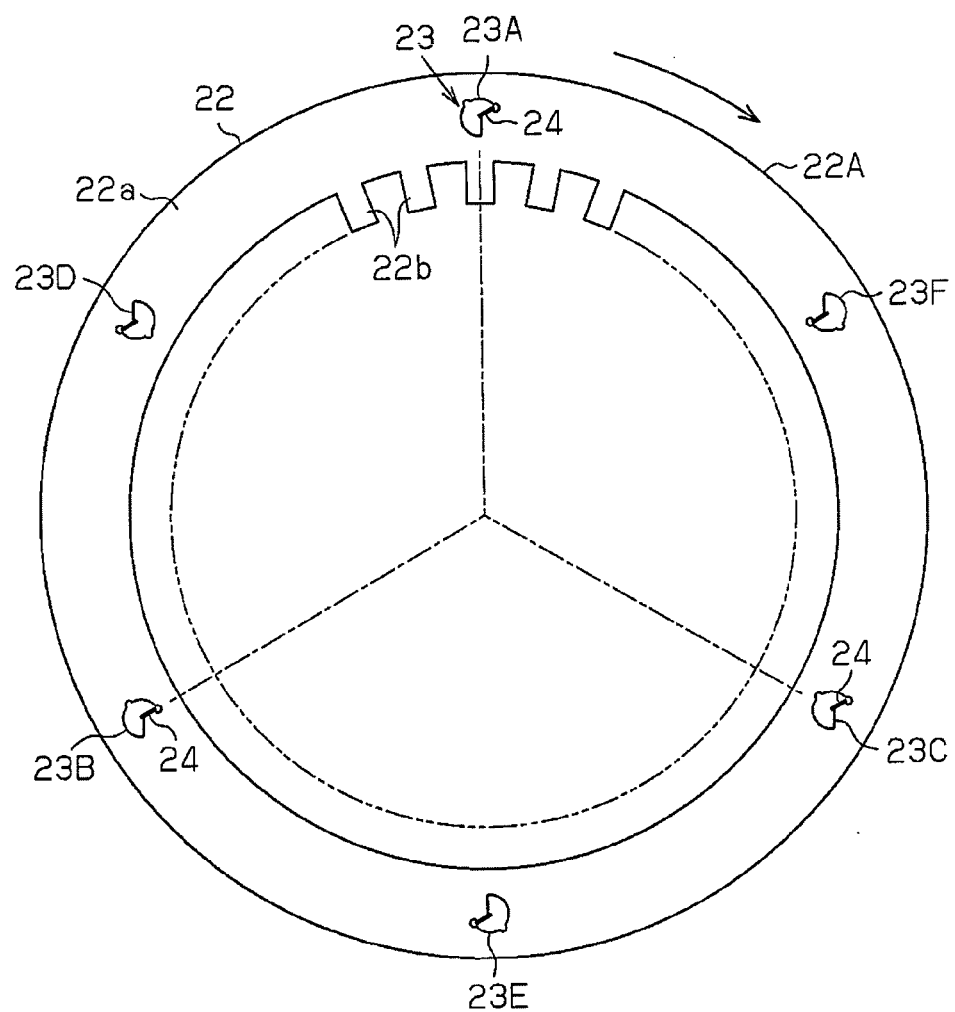
FIG. 2 is a plan view showing a first core plate of the stator core.

As shown in FIGS. 1 and 2, a stator core 21 is configured by laminating a plurality of core plates 22 each serving as a metal plate. Each of the core plates 22 includes an annular yoke portion 22a and a plurality of teeth 22b, which are arranged on the inner peripheral surface of the yoke portion 22a. A plurality of joint portions 23, which are identically shaped, are formed in the yoke portion 22a of each core plate 22 and separated by predetermined angular intervals. The joint portions 23 join the laminated core plates 22 to one another. In the first embodiment, each of the core plates 22 has six joint portions 23, which are separated by 60 degrees.

The configuration of each of the joint portions 23A, 23B, 23C, 23D, 23E, and 23F will hereafter be described in detail. Since the joint portions 23A to 23F are shaped identically, the description below is focused on the joint portion 23A formed in the first core plate 22A.

Figure 4A:
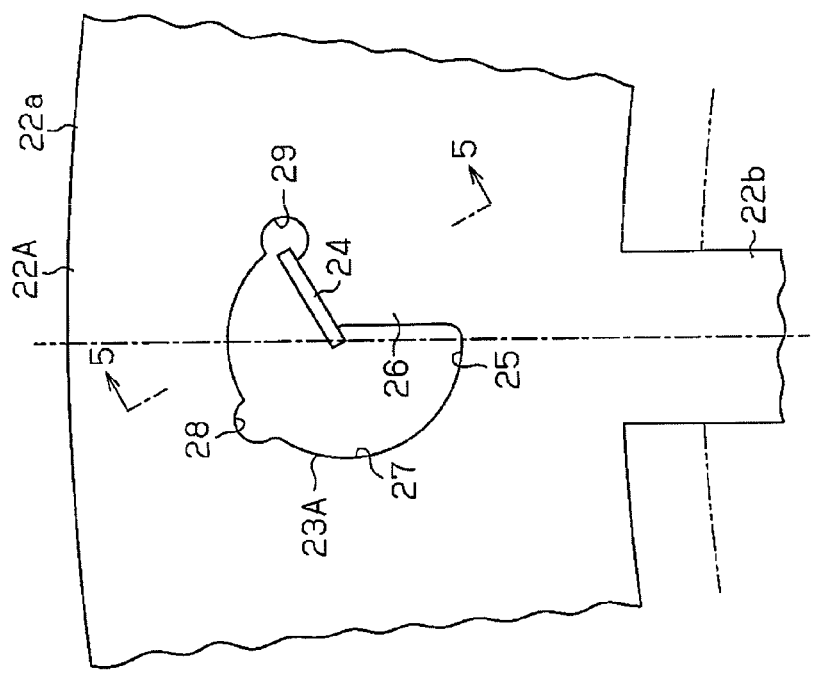
FIG. 4A is an enlarged plan view showing a portion in the vicinity of a joint portion before the fixing piece is cut and raised.
Figure 4B:
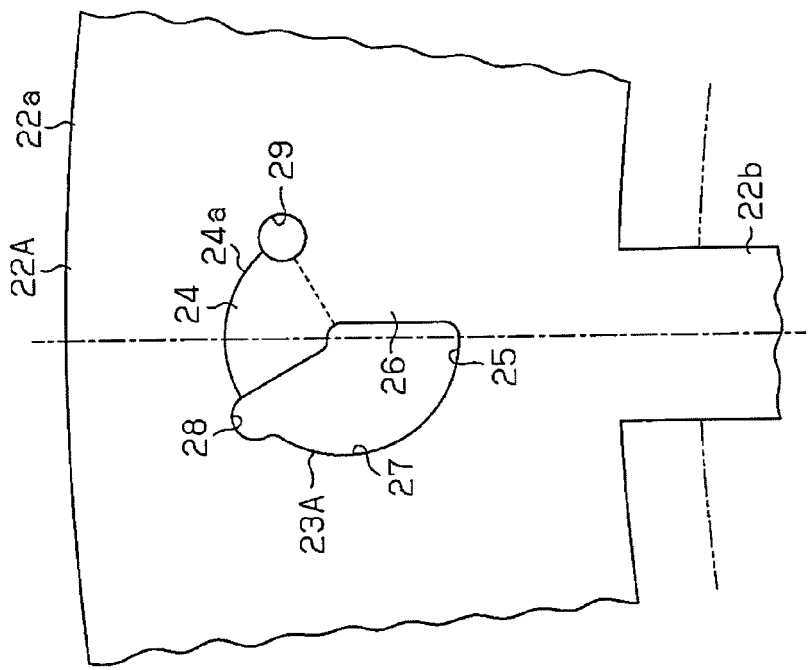
FIG. 4B is an enlarged plan view showing the portion in the vicinity of the joint portion after the fixing piece is cut and raised.
Figure 5:
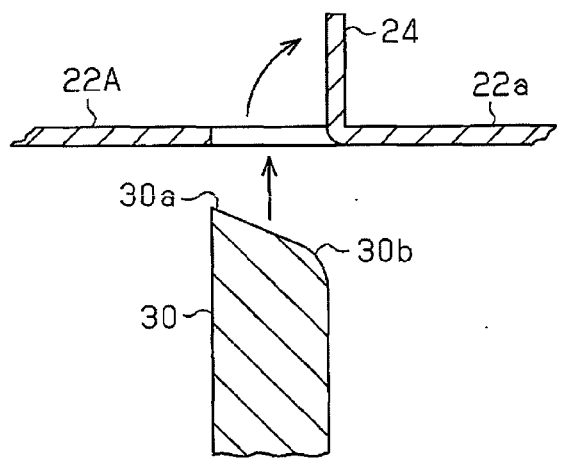
FIG. 5 is a partially cross-sectional view taken along line 5-5 in FIG. 4B.

With reference to FIGS. 4A, 4B, and 5, the joint portion 23A includes a fixing piece 24, a passage hole 25, and a receiving portion 26. The fixing piece 24 is raised in the laminating direction of the core plates 22A to 22C. The passage hole 25 receives the corresponding fixing piece 24 of the lower adjacent one of the core plates 22A to 22C. The fixing piece 24 in the passage hole 25 is then bent to join the receiving portion 26 to the core plate 22A to 22C having the fixing piece 24. An opening 27 for receiving the corresponding fixing piece 24 is formed in the joint portion 23A. Specifically, the opening 27 receives the fixing piece 24, which is bent on the receiving portion 26 of another adjacent core plate 22A to 22C, in such a manner as to prevent interference with the fixing piece 24. Each of the openings 27 is formed continuously from the associated one of the passage holes 25.

Figure 3:
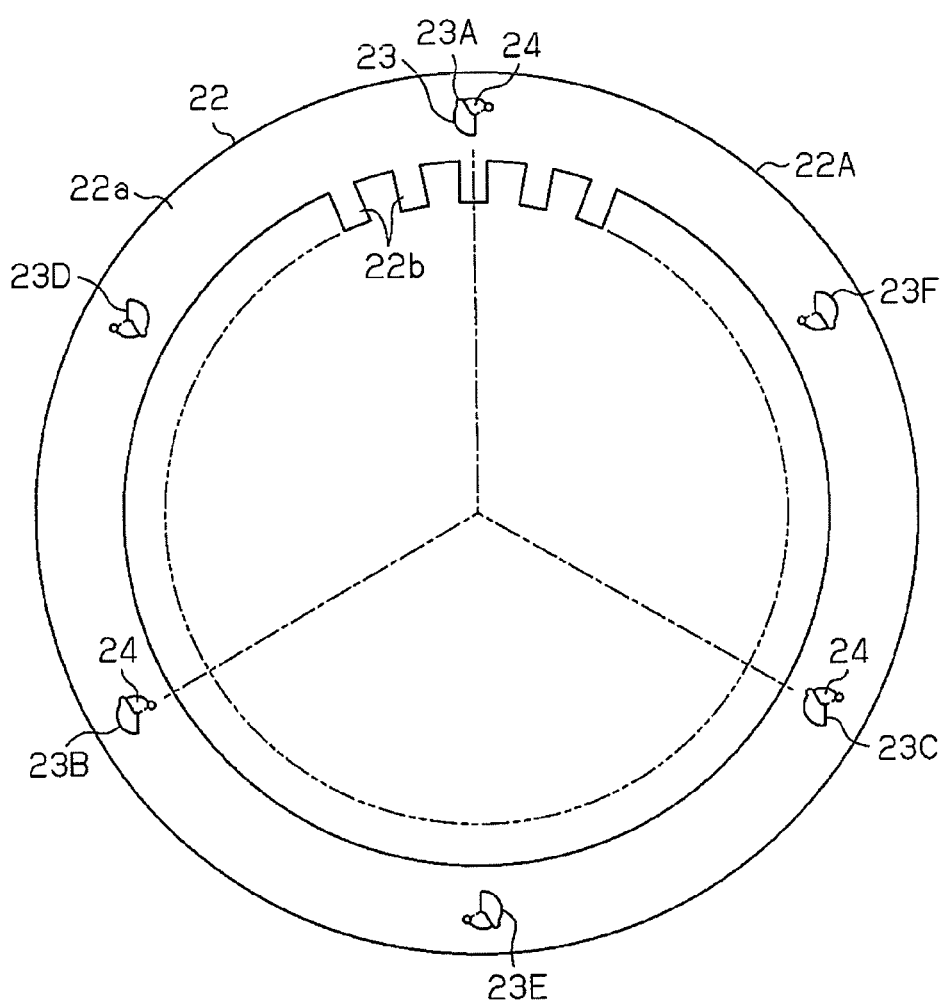
FIG. 3 is a plan view showing the first core plate before a fixing piece of each joint portion is cut and raised.

To form each joint portion 23A to 23F, as illustrated in FIGS. 3 and 4A, the passage hole 25, the receiving portion 26, the opening 27, and an outer peripheral curve 24a of the fixing piece 24, which has an arcuate shape, are first formed through punching. The passage holes 25, the fixing pieces 24, and the receiving portions 26 are formed in the zones separated by 120 degrees. To prevent a burr from being produced by cutting and raising each fixing piece 24, a recess 28 and a hole 29 are formed at opposite sides of the outer peripheral curve 24a of the fixing piece 24. Then, with reference to FIGS. 4B and 5, the fixing piece 24 is cut and raised from the core plate 22 using a cut-and-raise punch 30. The cut-and-raise punch 30 has a cutting edge 30a for cutting the outer peripheral curve 24a of each fixing piece 24 and a round portion 30b for bending a basal portion of the fixing piece 24.

The joint portions 23 are arranged such that the rotational angle phases of the joint portions 23 about the center of the core plates 22A to 22C are displaced by 60 degrees. Accordingly, as clearly shown in FIG. 2, the three joint portions 23A, 23B, 23C, which are separated by 120 degrees, are oriented in the same direction and formed each in a first pattern. The other three joint portions 23D, 23E, 23F, which are separated by 120 degrees, are formed each in a second pattern oriented in a different direction from the direction of the first pattern.

Figure 6:
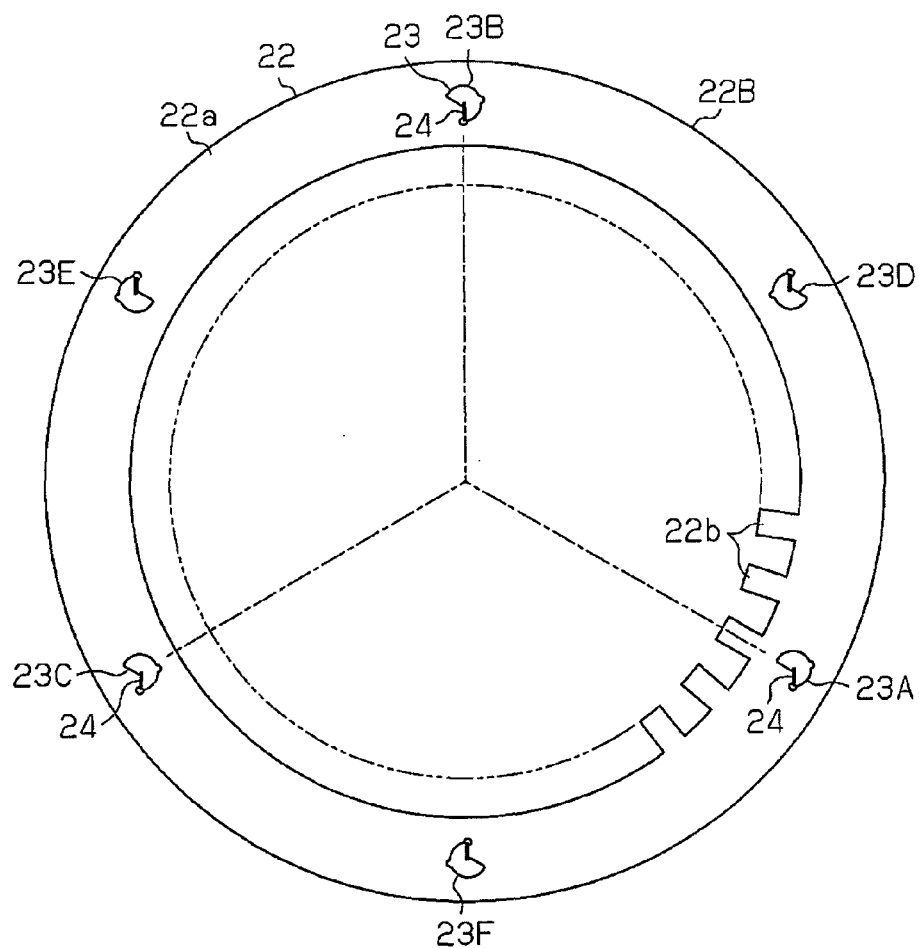
FIG. 6 is a plan view showing a second core plate with the first core plate rotated clockwise by 120 degrees.
Figure 7:
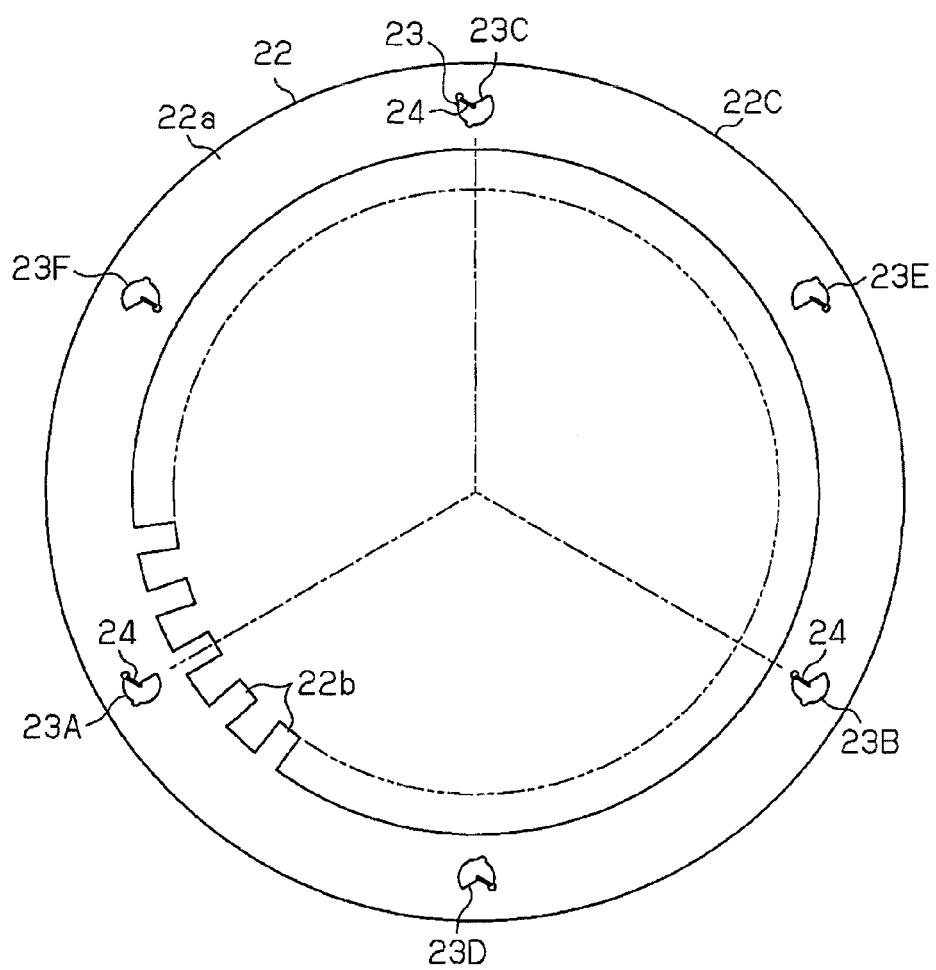
FIG. 7 is a plan view showing a third core plate with the first core plate rotated clockwise by 240 degrees.

When the core plates 22 are laminated, the second core plate 22B shown in FIG. 6 is arranged below the first core plate 22A illustrated in FIG. 2. The third core plate 22C illustrated in FIG. 7 is arranged below the second core plate 22B. Although the first to third core plates 22A to 22C are configured identically, the rotational angle phases of the joint portions 23A to 23F of the core plates 22A to 22C are offset by 120 degrees. Specifically, the joint portions 23A to 23F of the second core plate 22B, which is shown in FIG. 6, are offset clockwise from the joint portions 23A to 23F of the first core plate 22A by 120 degrees. The joint portions 23A to 23F of the third core plate 22C, which is illustrated in FIG. 7, are offset clockwise from the joint portions 23A to 23F of the first core plate 22A by 240 degrees. As the first to third core plates 22A, 22B, 22C are laminated repeatedly, the joint portions 23A to 23F located at the corresponding positions in each adjacent pair of the core plates 22A to 22C in the laminating direction are joined together. As a result, the laminated core plates 22A to 22C are fixed together.

A method for joining the core plates 22A to 22C together using the joint portions 23A to 23F at the time when the core plates 22A to 22C are rotationally laminated and operation of the stator core 21 will hereafter be described. In the first embodiment, the core plates 22A to 22C are laminated while being rotated by 120 degrees.

Figure 8A:
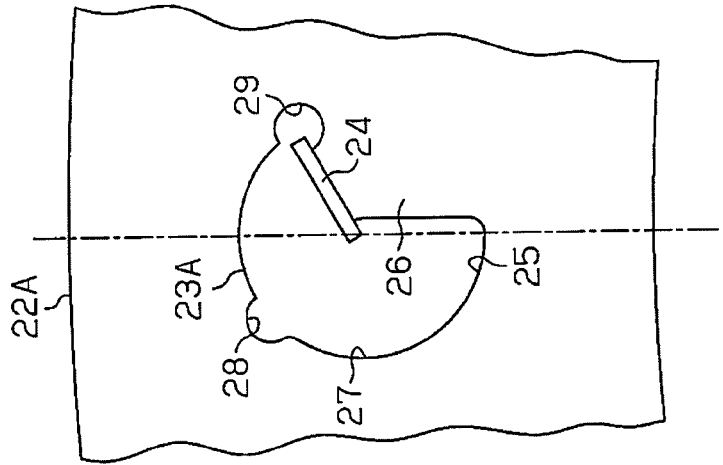
FIGS. 8A, 8B, and 8C are plan views showing the portions corresponding to the joint portions of the first to third core plates.
Figure 8B:
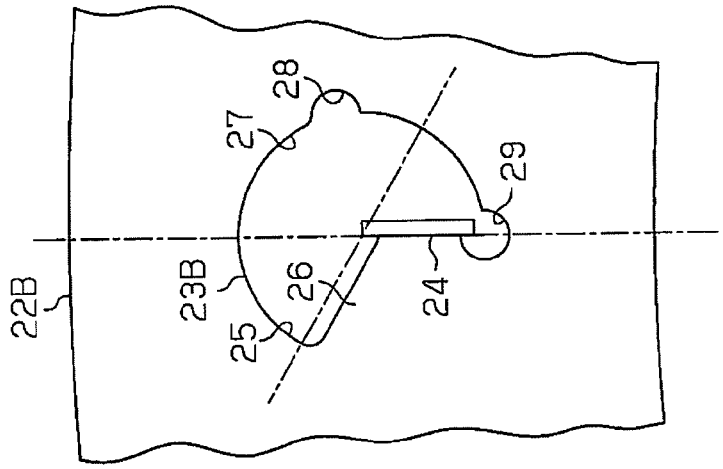
Figure 8C:
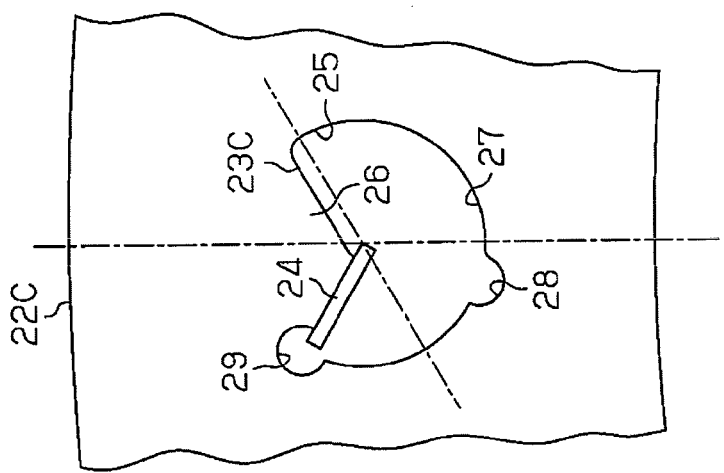

As shown in FIGS. 2, 6, and 7, when the first to third core plates 22A to 22C are laminated consecutively while being rotated by 120 degrees, the rotational angle phases of the joint portions 23A to 23F of each core plate 22A to 22C are arranged offset from the rotational angle phases of the joint portions 23A to 23F of the adjacent one of the core plates 22A to 22C in the laminating direction by 120 degrees. With reference to FIGS. 8A to 8C, the joint portion 23B of the second core plate 22B, which is below the first core plate 22A, and the joint portion 23C of the third core plate 22C, which is below the second core plate 22B, are arranged at positions offset from the joint portion 23A of the first core plate 22A, which is located at an upper position, by 120 degrees. As illustrated in FIG. 9A, when the first core plate 22A is laminated on the second core plate 22B, the fixing piece 24 of the joint portion 23B of the second core plate 22B is passed through the passage hole 25 of the joint portion 23A of the first core plate 22A.

Figure 10:
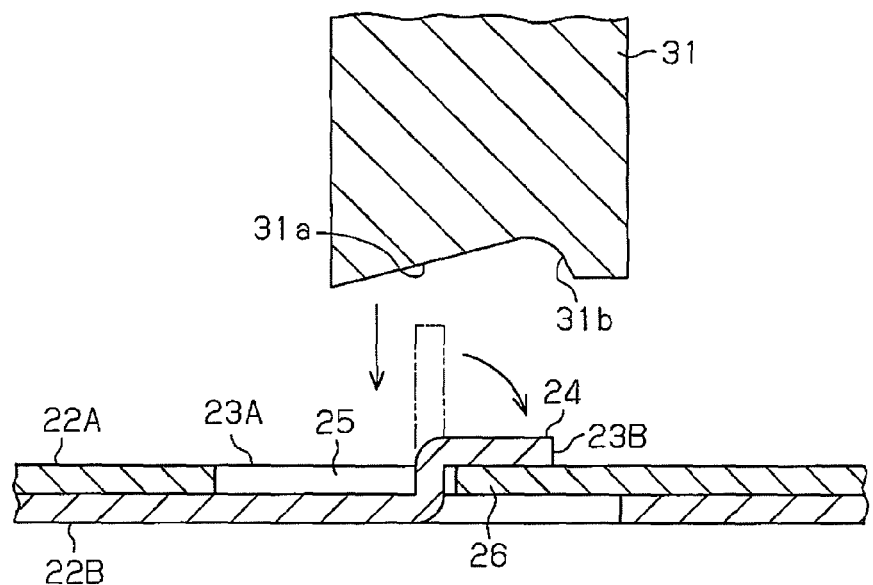
FIG. 10 is a partially cross-sectional view taken along line 10-10 in FIG. 9B.
Figure 11:
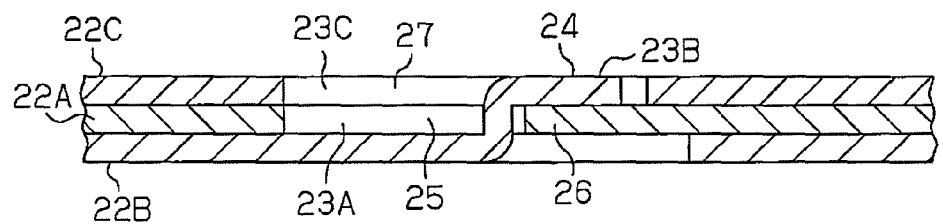
FIG. 11 is a partially cross-sectional view taken along line 11-11 in FIG. 9C.

As shown in FIGS. 9A and 10, the fixing piece 24 of the joint portion 23B of the second core plate 22B is then bent from the state in FIG. 9A using a bending punch 31 and laminated on the receiving portion 26 of the joint portion 23A of the first core plate 22A. The bending punch 31 has an inclined surface 31a and a round portion 31b. The inclined surface 31a presses and bends the fixing piece 24. The round portion 31b bends the fixing piece 24 continuously after the fixing piece 24 has been bent by the inclined surface 31a, thus preventing the fixing piece 24 from springing back. Through such bending of the fixing piece 24, the first core plate 22A, which is the upper core plate 22, is joined to the second core plate 22B, which is the lower core plate 22, in the laminated state.

Afterwards, as shown in FIG. 9C, when the third core plate 22C is laminated on the first core plate 22A, the fixing piece 24 of the joint portion 23A of the first core plate 22A is passed through the passage hole 25 of the joint portion 23C of the third core plate 22C. The fixing piece 24 of the first core plate 22A is then bent on the receiving portion 26 of the joint portion 23C of the third core plate 22C. As a result, the third core plate 22C is joined to the first core plate 22A in the laminated state. In this state, with reference to FIGS. 9C and 11, the fixing piece 24 of the joint portion 23B of the second core plate 22B, which is bent on the receiving portion 26 of the joint portion 23A of the first core plate 22A, is received in the opening 27 of the joint portion 23C of the third core plate 22C. This prevents interference between the bent fixing piece 24 of the second core plate 22B and the third core plate 22C. As a result, the third core plate 22C and the first core plate 22A are laminated with each other without forming a gap, extending parallel to each other.

By laminating and joining the first to third core plates 22A, 22B, 22C by means of the joint portions 23A to 23F in the above-described manner, the stator core 21 is assembled. In this state, the fixing pieces 24 of the joint portions 23A to 23C of the uppermost set of the core plates 22A to 22C in the stator core 21 are not cut or raised. Specifically, these fixing pieces 24 are cut at their bases and removed from the core plates 22A to 22C.

In the stator core 21, the fixing pieces 24 of the six joint portions 23A to 23F are bent to fix the first to third core plates 22A, 22B, 22C, which are adjacently located, in the laminated state. In other words, the fixing pieces 24 firmly hold the core plates 22A to 22C, which are adjacent in the laminating direction. The bent fixing pieces 24 are received in the corresponding openings 27 and prevented from hampering laminating of the core plates 22A to 22C. The surfaces of the fixing pieces 24 and the receiving portions 26 are coated with insulating membranes. This prevents electric connection between each fixing piece 24 and the corresponding receiving portion 26 even when the fixing piece 24 and the receiving portion 26 contact each other.

The first embodiment has the advantages described below.

(1) The multiple joint portions 23A to 23C are formed in each core plate 22A to 22C to join the core plates 22A to 22C in a laminated state. Each of the joint portions 23A to 23C has the fixing piece 24, the passage hole 25, the receiving portion 26, and the opening 27. The opening 27 receives the fixing piece 24 of the adjacent one of the core plate 22A to 22C in the laminating direction. The fixing piece 24, which is passed through the corresponding passage hole 25, is bent to join the receiving portion 26 to the adjacent core plate 22A to 22C. The opening 27 receives the corresponding fixing piece 24, which is bent on the receiving portion 26 of another core plate 22A to 22C, in such a manner as to prevent interference with the fixing piece 24.

As a result, by bending each fixing piece 24 on the corresponding receiving portion 26, the receiving portion 26 is held between the fixing piece 24 and the core plate 22A to 22C. This joins the adjacent core plates 22A to 22C together with improved strength, thus making it unnecessary to employ an additional component for joining the laminated core plates 22A to 22C together. Each bent fixing piece 24 is received in the corresponding opening 27 of another one of the core plates 22A to 22C. This prevents interference between the fixing piece 24 and the core plate 22A to 22C, thus allowing the core plates 22A to 22C to be laminated without a gap and extended accurately parallel to one another. Further, since each bent fixing piece 24 contacts the corresponding receiving portion 26 through the insulating membrane arranged on the surfaces of the fixing piece 24, eddy-current loss decreases. As a result, a simply configured high-strength and high-efficiency core for a rotating electrical machine is obtained.

(2) Each opening 27 is formed continuously from the associated passage hole 25. This allows the passage hole 25 and the opening 27 to be formed simultaneously through punching using a single set of a punch and a die.

Second Embodiment

A stator core for a motor according to a second embodiment of the present invention will now be described with reference to FIGS. 12 to 15. Detailed description of components of the second embodiment that are the same as or like corresponding components of the first embodiment is omitted herein.

Figure 12:
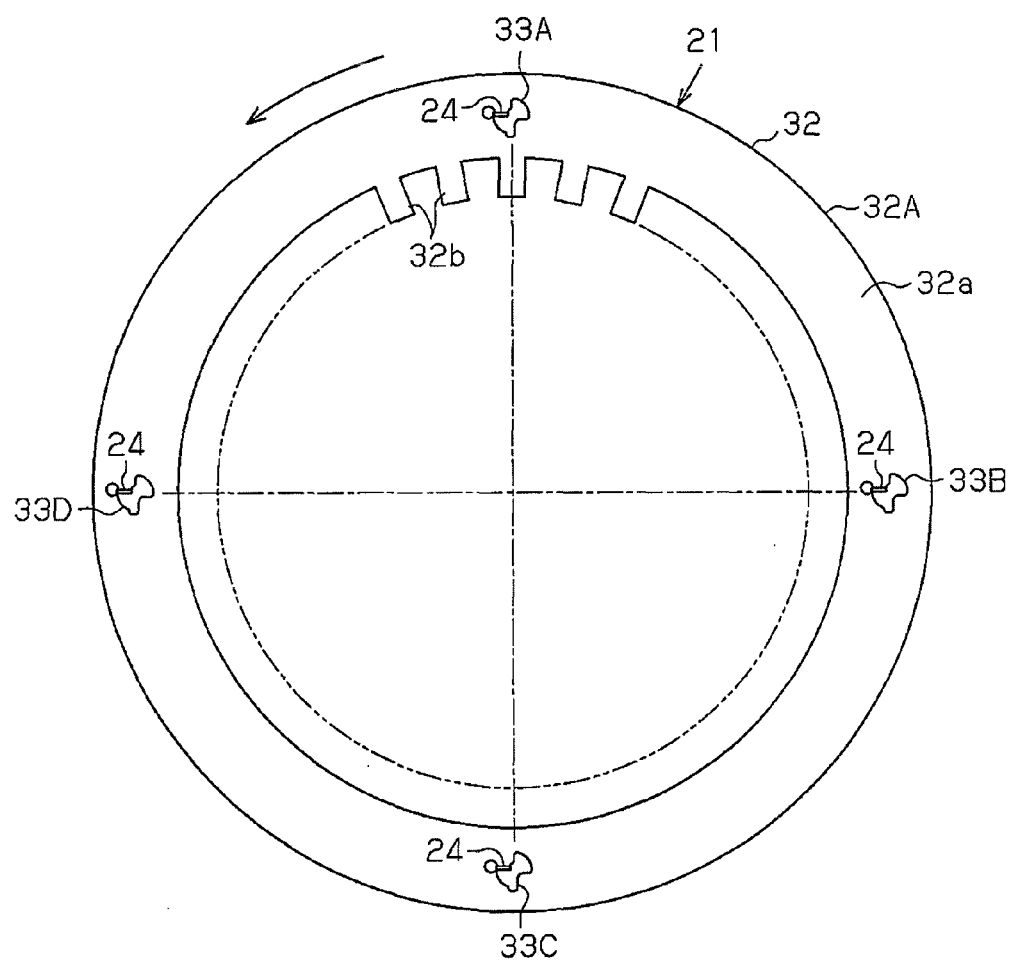
FIG. 12 is a plan view showing a core plate of a stator core according to a second embodiment of the present invention.
Figure 14A:
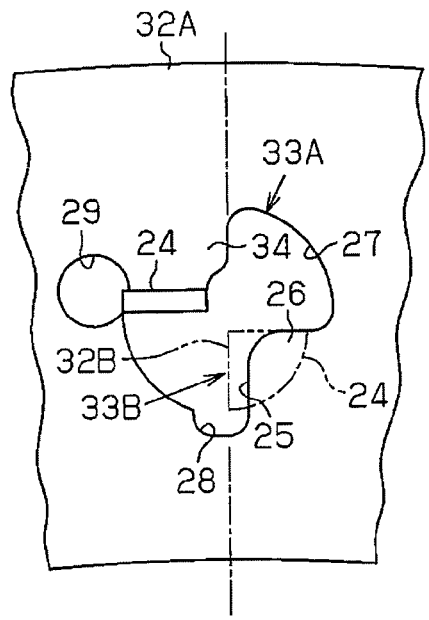
FIGS. 14A, 14B, 14C, and 14D are enlarged plan views showing the portion in the vicinity of the joint portion of the core plate with the phases offset by 90 degrees.
Figure 14B:
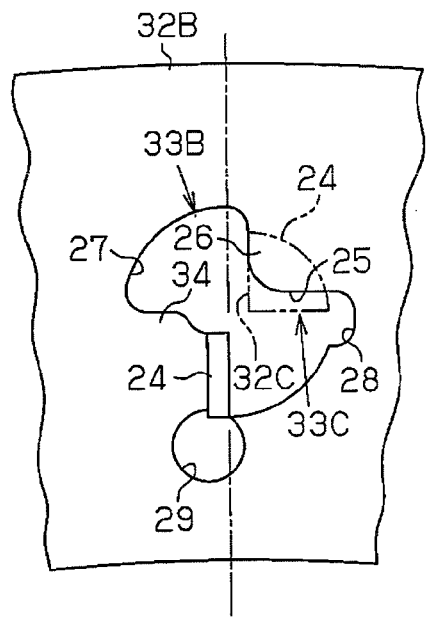
Figure 14C:
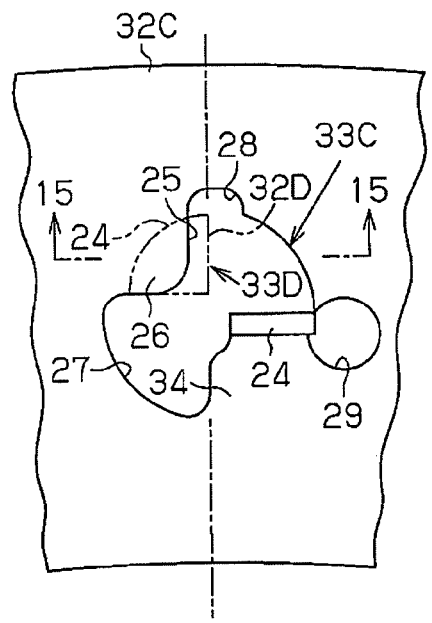
Figure 14D:
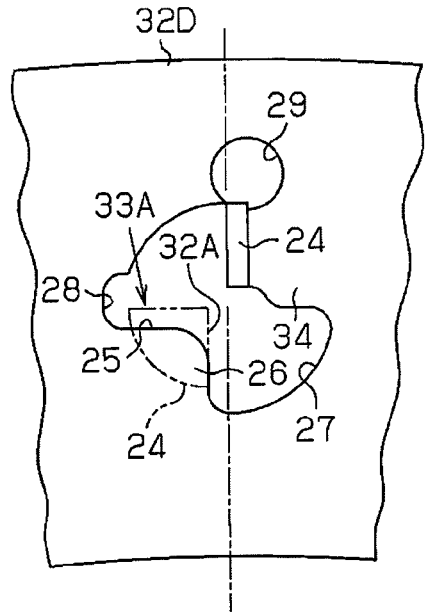

As shown in FIG. 12, a stator core 21 is formed by a core piece 32 having a yoke portion 32a. The yoke portion 32a includes four joint portions 33A, 33B, 33C, and 33D, which are shaped identically and separated by 90 degrees. The rotational angle phase of each of the joint portions 33A to 33D with respect to the center of the core plates 32A to 32C is offset with respect to an adjacent one of joint portions 33A to 33D by 90 degrees.

As shown in FIG. 13B, each of the joint portions 33A to 33D has a fixing piece 24, a passage hole 25, a receiving portion 26, a opening 27, a recess 28, and a hole 29, which are substantially identical to the corresponding components of the first embodiment. Each joint portion 33A to 33D also includes a holding portion 34 for holding the fixing piece 24 when the fixing piece 24 is bent on the corresponding receiving portion 26. To form each joint portion 33A to 33D, a passage hole 25, a receiving portion 26, an opening 27, a recess 28, a hole 29, a holding portion 34, and an outer peripheral curve 24a of the fixing piece 24 having an arcuate shape are formed through punching, as illustrated in FIG. 13A. The passage holes 25, the openings 27, the holding portions 34, and the fixing pieces 24 are arranged in the zones separated by 90 degrees. Then, with reference to FIG. 13B, each fixing piece 24 is cut and raised about the base of the fixing piece 24.

The core plates 32A to 32D, which are configured in the above-described manner, are laminated consecutively at offset phases at 90 degrees. As a result, as illustrated in FIGS. 14A to 14D, the joint portion 33B of the second core plate 32B, the joint portion 33B of the third core plate 32C, and the joint portion 33D of the fourth core plate 32D, which are located below the first core plate 32A, are arranged in correspondence with the joint portion 33A of the first core plate 32A, which is arranged above the other core plates 32B to 32D, at positions offset by 90 degrees with respect to one another.

As indicated by the corresponding chain lines in FIGS. 14A to 14D, when the first to fourth core plates 32A to 32D are laminated, the fixing piece 24 of each joint portion 33A to 33D of the lower one of the core plates 32A to 32D is passed through the passage hole 25 of the corresponding joint portion 33A to 33D of the upper one of the core plates 32A to 32D. The fixing piece 24 in the passage hole 25 is then bent on the receiving portion 26 to join the laminated core plates 32A to 32D to one another in the laminated state. In this state, each bent fixing piece 24 is received in the opening 27 of the corresponding joint portion 33A to 33D of the most adjacent one of the core plates 32A to 32D located above the fixing piece 24. The bent fixing piece 24 is also held from above by the holding portion 34 of the corresponding joint portion 33A to 33D of the second most adjacent one of the core plates 32A to 32D above the fixing piece 24.

Figure 15:
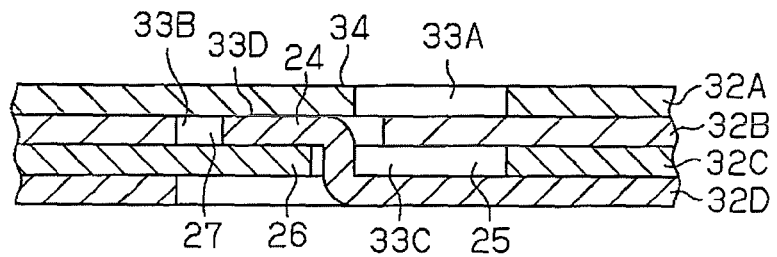
FIG. 15 is a partially cross-sectional view taken along line 15-15 in FIG. 14C.

With reference to FIG. 15, the fixing piece 24 of the joint portion 33D of the fourth core plate 32D is bent on the receiving portion 26 of the joint portion 33C of the third core plate 32C, received in the opening 27 of the joint portion 33B of the second core plate 32B, and held from above by the holding portion 34 of the joint portion 33A of the first core plate 32A. This prevents interference between the bent fixing piece 24 and the second core plate 32B and the fixing piece 24 is maintained without being separated from the receiving portion 26.

The second embodiment has the advantage described below in addition to the advantages (1) and (2) of the first embodiment.

(3) Each fixing piece 24 bent on the corresponding receiving portion 26 is held by the corresponding holding portion 34. In other words, the holding portion 34 holds the bent fixing piece 24 to prevent the fixing piece 24 from being separated from the receiving portion 26. The force for joining the core plates 32A to 32D together is thus prevented from being decreased through such separation of the fixing piece 24. Gap formation between the adjacent core plates 32A to 32D is also prevented.

Third Embodiment

A stator core for a motor according to a third embodiment of the present invention will now be described with reference to FIGS. 16 to 17. Detailed description of components of the third embodiment that are the same as or like corresponding components of the first embodiment is omitted herein.

Figure 16:
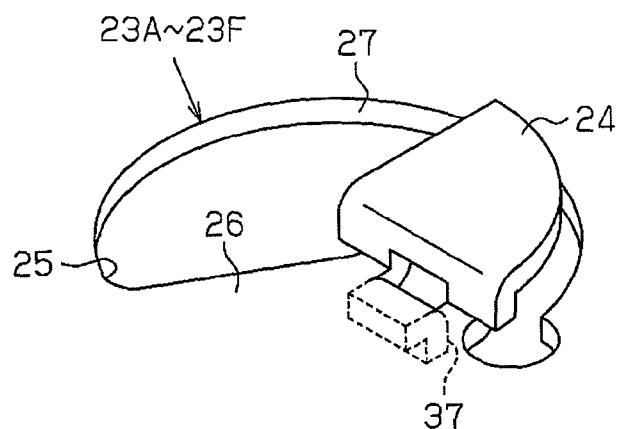
FIG. 16 is an enlarged perspective view showing a portion in the vicinity of a joint portion in a core plate of a stator core according to a third embodiment of the invention.
Figure 17:
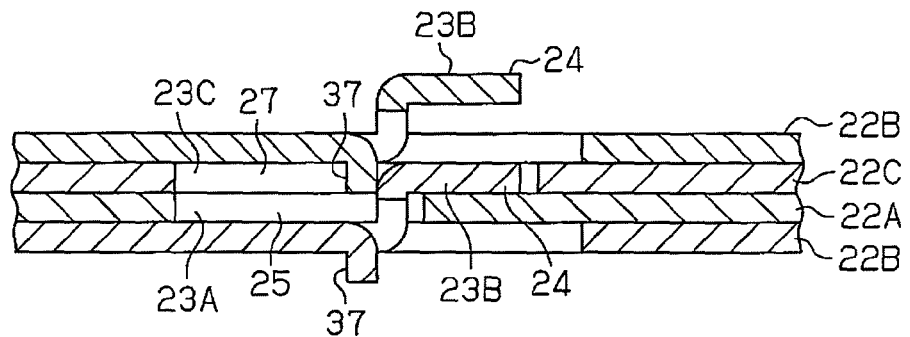
FIG. 17 is an enlarged cross-sectional view showing the joint portion in the core plate.

With reference to FIGS. 16 and 17, core plates 22A to 22C have joint portions 23A to 23F, respectively, which are similar to those of the first embodiment. A holding portion 37 is formed in the base of the fixing piece 24 of each joint portion 23A to 23F. The holding portion 37 is bent in the opposite direction to the direction in which the fixing piece 24 is bent. After the fixing piece 24 is bent to join the corresponding core plates 22A to 22C together and another core plate 22A to 22C is laminated on the joined core plates 22A to 22C, the holding portion 37 of the laminated core plate 22A to 22C contacts the base of the bent fixing piece 24. As a result, the holding portion 37 maintains the fixing piece 24 in the bent state and prevents the fixing piece 24 from being separated.

The third embodiment has substantially the same advantages as the advantages of the second embodiment.

Fourth Embodiment

A stator core for a motor according to a fourth embodiment of the present invention will now be described with reference to FIGS. 18A to 20. Detailed description of components of the fourth embodiment that are the same as or like corresponding components of the first embodiment is omitted herein.

Figure 18A:
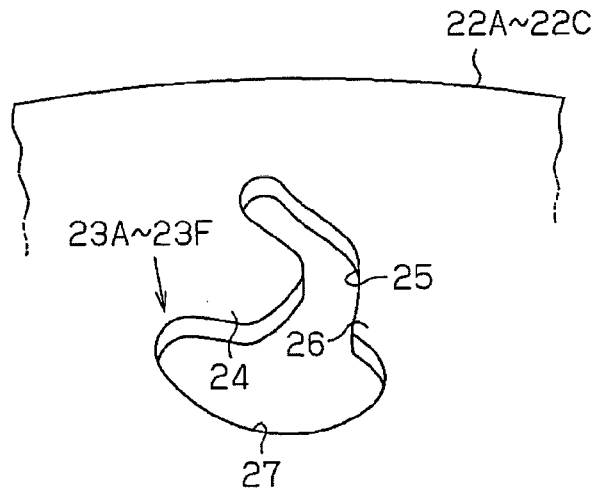
FIGS. 18A, 18B, and 18C are perspective views each showing a portion corresponding to a joint portion in a core plate of a stator core according to a fourth embodiment of the invention to illustrate a method for forming the joint portion.
Figure 18B:
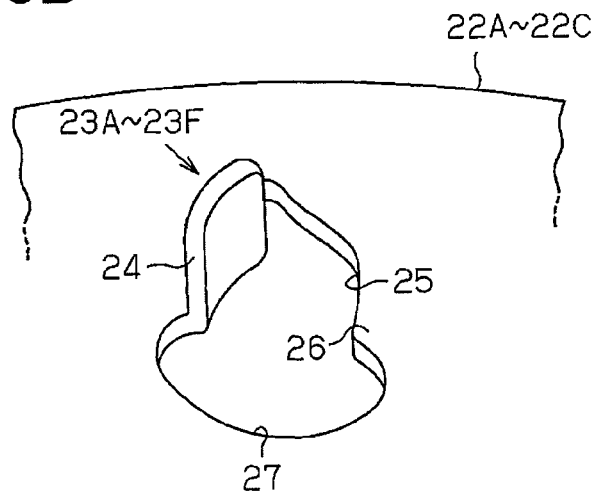

As illustrated in FIGS. 18A to 20, each of core plates 22A to 22C has joint portion 23A to 23F, which is similar to the corresponding portion of the first embodiment. Each of the joint portions 23A to 23F has a fixing piece 24, a passage hole 25, a receiving portion 26, and an opening 27, which are substantially identical to those of each joint portion 23A to 23F of the first embodiment. To form each joint portion 23A to 23F, as illustrated in FIG. 18A, the passage hole 25, the receiving portion 26, the opening 27, and the outer peripheral curve of the fixing piece 24 having a trapezoidal shape are formed through punching. Then, with reference to FIGS. 18B and 19, each fixing piece 24 is cut and raised with respect to the base of the fixing piece 24 using a pillar-like cut-and-raise punch 38 and a die 39 having a hole for receiving the punch. As shown in FIG. 18B, the cut and raised fixing piece 24 is curved with respect to a plane intersecting the direction in the fixing piece 24 is raised. In other words, the inner wall surface of the fixing piece 24 facing the passage hole 25 extends in an arcuate shape.

Figure 18C:
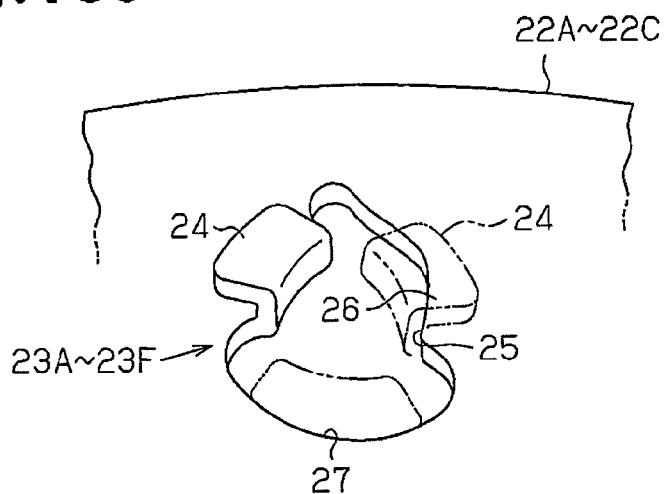

With reference to FIG. 18C, when the core plates 22A to 22C are laminated, the fixing piece 24 of the joint portion 23A to 23F of the lower one of the core plates 22A to 22C is passed through the passage hole 25 of the joint portion 23A to 23F of the upper one of the core plates 22A to 22C. Then, as illustrated in FIGS. 18C and 20, the fixing piece 24 is bent on the corresponding receiving portion 26 using a bending punch 40 and a die 41 to join the laminated core plates 22A to 22C. Specifically, the fixing piece 24 is bent outward. In other words, the fixing piece 24 is bent in a flat plate-like shape and held in contact with the receiving portion 26, which is located below the fixing piece 24.

The fourth embodiment has the advantage described below in addition to the advantages (1) and (2) of the first embodiment.

(4) The fixing piece 24 of each joint portion 23A to 23F is cut and raised in the arcuate shape. The fixing piece 24 is then passed through the passage hole 25 of the corresponding joint portion 23A to 23F of the upper one of the core plates 22A to 22C and, in this state, bent on the corresponding receiving portion 26 in a flat plate-like shape. This prevents the fixing piece 24 from restoring the raised posture from the bent position. As a result, the core plates 22A to 22C are maintained in the laminated state.

Fifth Embodiment

A stator core for a motor according to a fifth embodiment of the present invention will now be described with reference to FIGS. 21 to 22. Detailed description of components of the fifth embodiment that are the same as or like corresponding components of the first embodiment is omitted herein.

Figure 21:
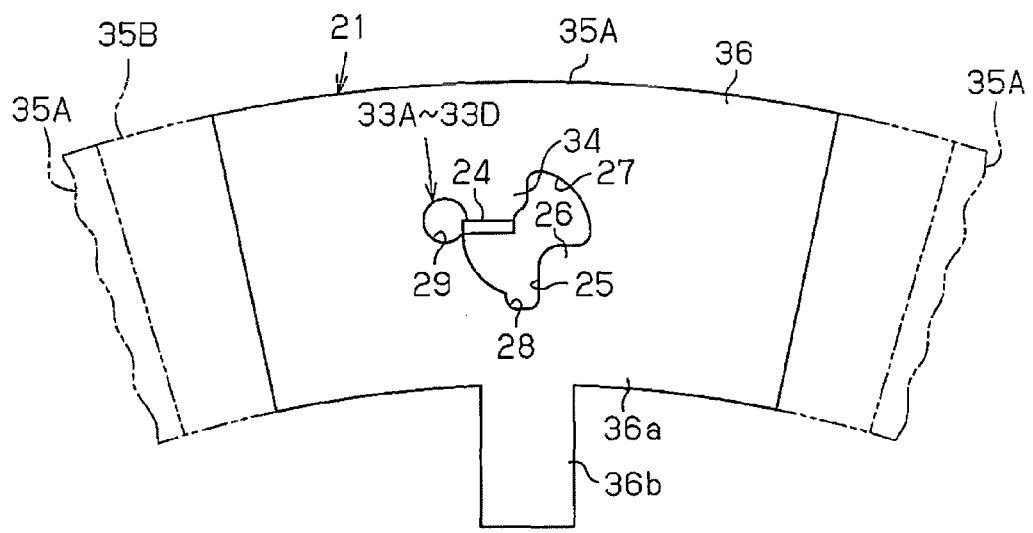
FIG. 21 is a plan view showing a core plate of a split type stator core according to a fifth embodiment of the invention.
Figure 22:
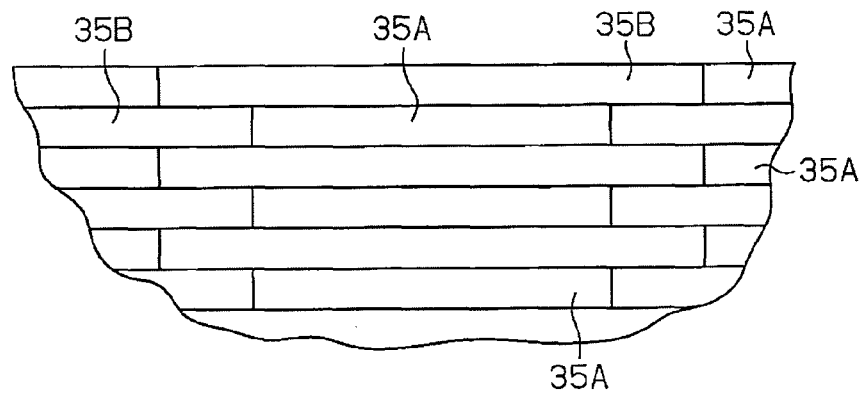
FIG. 22 is a side view showing a portion of the stator core.

As illustrated in FIGS. 21 and 22, the stator core 21 is configured by joining a plurality of split core pieces 36 together in an annular shape. Each of the split core pieces 36 is configured by laminating a plurality of core plates 35A, 35B. Each of the core plates 35A, 35B includes an arcuate yoke portion 36a and a tooth 36b projected from the inner peripheral surface of the yoke portion 36a. The joint portions 33A to 33D, which are identical to the joint portions 33A to 33D of the second embodiment, are formed at the center of the yoke portion 36a of each core plate 35A, 35B. Specifically, four core plates 35A, 35B, which are to be laminated, are defined as one set. The joint portions 33A to 33D, which are illustrated in FIGS. 14A to 14D, are formed consecutively on each core plate 35A, 35B. The joint portions 33A to 33D are joined together to maintain the core plates 35A, 35B in a laminated state. With reference to FIGS. 21 and 22, the length of each core plate 35A is different from the length of each core plate 35B. The core plates 35A, 35B are arranged alternately in a circumferential direction of each split core piece 36. As a result, each of the opposite ends of each core plate 35B is overlapped with the circumferentially adjacent core plates 35B.

The fifth embodiment has substantially the same advantages as the advantages of the first and second embodiments.

The illustrated embodiments may be modified to the forms described below.

In each of the illustrated embodiments, the number of the joint portions may be modified. For example, it is preferable to change the number of the joint portions to a multiple of three in the first embodiment and to a multiple of four in the second embodiment.

The present invention may be embodied as a rotor core for a motor.

The invention may be embodied as a core for a transformer.

What is claimed is:

1. A laminate defined by a plurality of laminated metal plates, the laminate comprising:
 a joint portion provided in each of the metal plates, the joint portion of a first one of the metal plates being joined to the joint portion of a second one of the metal plates;
 a fixing piece provided in each of the joint portions, the fixing piece being raised in the laminating direction of the metal plates;
 a passage hole provided in each of the joint portions, the fixing piece of the first metal plate being passed through the passage hole of the second metal plate;
 a receiving portion provided in each of the joint portions, the fixing piece of the first metal plate being bent onto and joined with the receiving portion of the second metal plate; and an opening provided in each one of the joint portions, wherein the opening of each metal plate is arranged continuously with the passage hole of the same joint portion and on the same metal plate in which each opening is provided, and the opening of a third one of the metal plates receiving the fixing piece of the first metal plate is bent on the receiving portion of the second metal plate to avoid interference between the third metal plate and the fixing piece of the first metal plate.

2. The laminate according to claim 1, further comprising a holding portion provided on each of the metal plates, the holding portion holding the fixing piece bent onto the corresponding receiving portion.

3. The laminate according to claim 1, wherein the fixing piece of each metal plate is defined by a curved inner wall surface facing the passage hole of the metal plate from which each associated fixing piece is raised in a plane intersecting the direction in which the fixing piece is raised.

4. The laminate according to claim 1, wherein the metal plates are laminated such that the phase of each metal plate is offset with respect to an adjacent one of the metal plates by a predetermined angle.

5. The laminate according to claim 4, wherein the joint portions are separated by pitches corresponding to the predetermined angle, and the orientations of the joint portions are offset by the predetermined angle.

6. A core for a rotating electrical machine, wherein the core is provided by the laminate of the metal plates according to claim 1.

7. A method for laminating a laminate formed by laminating a plurality of metal plates, comprising:

forming, in each of the metal plates, a fixing piece, a passage hole, a receiving portion, and an opening arranged continuously with the passage hole of the same metal plate in which each opening is provided, each fixing piece being raised from the metal plate from which the fixing piece is formed;

joining a first and a second one of the metal plates together by passing the fixing piece of the first metal plate through the passage hole provided in the second metal plate and then bending the fixing piece onto the receiving portion of the second metal plate; and receiving the bent fixing piece of the first metal plate in the opening of a third one of the metal plates to avoid interference between the third metal plate and the fixing piece of the first metal plate.

8. The method according to claim 7, wherein the metal plates are laminated such that the phase of each metal plate is offset with respect to an adjacent one of the metal plates by a predetermined angle.

9. The method according to claim 7, comprising:

curving an inner wall surface of each fixing piece facing the passage hole in a plane intersecting the direction in which the fixing piece is raised; and bending each curved fixing piece outward on the corresponding receiving portion.

* * * * *